United States Patent
Roziere et al.

(10) Patent No.: US 10,592,046 B2
(45) Date of Patent: Mar. 17, 2020

(54) METHOD OF MULTI-ZONE CAPACITIVE SENSING, DEVICE AND APPARATUS IMPLEMENTING THE METHOD

(71) Applicant: QUICKSTEP TECHNOLOGIES LLC, Wilmington, DE (US)

(72) Inventors: Didier Roziere, Nimes (FR); Eric Legros, Ales (FR)

(73) Assignee: QuickStep Technologies LLC, Wilmington, DE (US)

( * ) Notice: Subject to any disclaimer, the term of this patent is extended or adjusted under 35 U.S.C. 154(b) by 0 days.

(21) Appl. No.: 14/784,264

(22) PCT Filed: Apr. 9, 2014

(86) PCT No.: PCT/EP2014/057158
§ 371 (c)(1),
(2) Date: Oct. 13, 2015

(87) PCT Pub. No.: WO2014/170180
PCT Pub. Date: Oct. 23, 2014

(65) Prior Publication Data
US 2016/0034102 A1 Feb. 4, 2016

(30) Foreign Application Priority Data

Apr. 15, 2013 (FR) ...................................... 13 53371

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04101* (2013.01); *G06F 2203/04104* (2013.01)

(58) Field of Classification Search
CPC ..................................................... G06F 3/0418
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |

(Continued)

FOREIGN PATENT DOCUMENTS

| | | |
|---|---|---|
| EP | 2 267 791 A2 | 12/2010 |
| FR | 2756048 A1 | 5/1998 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Sejoon Ahn
(74) *Attorney, Agent, or Firm* — Kubota & Basol LLP (57) ABSTRACT

A method is provided for capacitive detection, implementing a plurality of electrodes capable of allowing the detection of objects in their proximity by capacitive coupling, and including a step of simultaneous polarization of at least a part of the electrodes with different excitation potentials, the excitation potentials being generated with respect to a reference potential such that the scalar product over a predetermined duration of at least two of these excitation potentials is zero or very much less than the scalar product of one and/or the other of these excitation potentials with itself over the predetermined duration. A device and an appliance implementing the method are also provided.

19 Claims, 2 Drawing Sheets

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,844,506 A | 12/1998 | Binstead | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,429,840 B1* | 8/2002 | Sekiguchi | G04G 9/0029 345/87 |
| 6,690,387 B2 | 2/2004 | Zimmerman et al. | |
| 6,847,354 B2 | 1/2005 | Vranish | |
| 7,015,894 B2 | 3/2006 | Morohoshi | |
| 7,184,064 B2 | 2/2007 | Zimmerman et al. | |
| 7,570,064 B2 | 8/2009 | Roziere | |
| 7,663,607 B2 | 2/2010 | Hotelling et al. | |
| 8,054,299 B2* | 11/2011 | Krah | G06F 3/044 178/18.06 |
| 8,149,002 B2 | 4/2012 | Ossart et al. | |
| 8,159,213 B2 | 4/2012 | Roziere | |
| 8,479,122 B2 | 7/2013 | Hotelling et al. | |
| 8,770,033 B2 | 7/2014 | Roziere | |
| 8,810,524 B1* | 8/2014 | Rosenberg | G06F 1/1643 345/1.1 |
| 8,917,256 B2 | 12/2014 | Roziere | |
| 9,035,903 B2 | 5/2015 | Binstead | |
| 9,740,340 B1* | 8/2017 | Rosenberg | G06F 3/044 |
| 2002/0121146 A1* | 9/2002 | Manaresi | B63H 9/06 73/862.68 |
| 2006/0097733 A1 | 5/2006 | Roziere | |
| 2006/0158129 A1* | 7/2006 | Kitagawa | G09G 3/2965 315/169.4 |
| 2006/0197753 A1* | 9/2006 | Hotelling | G06F 1/1637 345/173 |
| 2006/0250534 A1* | 11/2006 | Kutscher | G02F 1/13338 349/41 |
| 2007/0021087 A1* | 1/2007 | Turner | H04B 1/1027 455/298 |
| 2007/0262966 A1* | 11/2007 | Nishimura | G06F 3/044 345/173 |
| 2008/0047764 A1* | 2/2008 | Lee | G08C 21/00 178/18.06 |
| 2008/0157893 A1* | 7/2008 | Krah | G06F 3/0418 331/177 R |
| 2008/0259044 A1* | 10/2008 | Utsunomiya | G06F 3/044 345/173 |
| 2008/0284261 A1 | 11/2008 | Andrieux et al. | |
| 2009/0027349 A1* | 1/2009 | Comerford | G06F 1/1626 345/173 |
| 2009/0127005 A1* | 5/2009 | Zachut | G06F 3/0418 178/18.03 |
| 2009/0277696 A1* | 11/2009 | Reynolds | G06F 3/03547 178/18.06 |
| 2010/0052700 A1 | 3/2010 | Yano et al. | |
| 2010/0097346 A1* | 4/2010 | Sleeman | G06F 3/0412 345/174 |
| 2010/0117993 A1* | 5/2010 | Kent | G06F 3/0418 345/177 |
| 2011/0050624 A1* | 3/2011 | Lee | G06F 3/045 345/174 |
| 2011/0084857 A1* | 4/2011 | Marino | G06F 3/044 341/5 |
| 2011/0169783 A1 | 7/2011 | Wang et al. | |
| 2011/0175847 A1* | 7/2011 | Wang | G06F 3/0416 345/174 |
| 2012/0044662 A1 | 2/2012 | Kim et al. | |
| 2012/0187965 A1 | 7/2012 | Roziere | |
| 2012/0188200 A1 | 7/2012 | Roziere | |
| 2013/0135247 A1 | 5/2013 | Na et al. | |
| 2013/0211757 A1* | 8/2013 | Miyamoto | G06F 3/0416 702/65 |
| 2013/0307776 A1 | 11/2013 | Roziere | |
| 2014/0049510 A1* | 2/2014 | Chung | G06F 3/0416 345/174 |
| 2014/0132335 A1 | 5/2014 | Rauhala et al. | |
| 2014/0185736 A1* | 7/2014 | Chandrashekar | H03K 21/026 377/48 |
| 2014/0213323 A1* | 7/2014 | Holenarsipur | H03K 17/955 455/566 |
| 2014/0362037 A1* | 12/2014 | Kao | G06F 3/042 345/174 |
| 2015/0035792 A1 | 2/2015 | Roziere et al. | |
| 2016/0001496 A1* | 1/2016 | Chow | G06F 3/044 345/173 |
| 2016/0195993 A1 | 7/2016 | Zachut et al. | |

FOREIGN PATENT DOCUMENTS

| | | |
|---|---|---|
| JP | 2000-163031 A | 6/2000 |
| JP | 2002-342033 A | 11/2002 |
| JP | 2011-519458 A | 7/2011 |
| WO | WO-2012/009493 A2 | 1/2012 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Search Report dated Dec. 13, 2018, for CN Application No. 201480027820.8, with English translation, four pages.

* cited by examiner

METHOD OF MULTI-ZONE CAPACITIVE SENSING, DEVICE AND APPARATUS IMPLEMENTING THE METHOD

BACKGROUND

The present invention relates to a method and a device for multizone capacitive detection. The field of the invention is more particularly but non-limitatively that of capacitive detection systems and touch and contactless human-machine interfaces.

Many communications and work appliances use touch or contactless measurement interfaces as a human-machine interface for entering commands. These interfaces can in particular be in the form of pads or touch screens. They are found for example in mobile phones, smart phones, touch-screen computers, tablets, pads, PCs, mice, touch screens and widescreens, etc.

These interfaces frequently use capacitive technologies. The measurement surface is equipped with conductive electrodes linked to electronic means which make it possible to measure the variation in the capacitances produced between electrodes and the object to be detected in order to carry out a command.

It is possible to produce transparent electrodes, which make it possible to superimpose an interface on a display screen, for example of a smart phone.

The majority of these interfaces are touch interfaces, i.e. they can detect the contact of one or more object(s) of interest or command (such as fingers or a stylus) with the surface of the interface.

Increasingly, gestural or contactless interfaces are being developed that are capable of detecting command objects at a greater distance from the interface, without contact with the surface.

The development of contactless interfaces requires the implementation of highly sensitive capacitive measurement techniques and the provision of a high degree of protection against environmental interference. In fact, the capacitance created between capacitive measurement electrodes of the interface and command objects is inversely proportional to the distance between them.

Document FR 2 756 048 by Rozière is known, which discloses a capacitive measurement method which makes it possible to measure the capacitance and the distance between a plurality of independent electrodes and an object in proximity.

This technique makes it possible to obtain measurements of capacitance between the electrodes and the objects with a high resolution and sensitivity, allowing the detection for example of a finger at a distance of several centimetres or even ten centimetres. The detection can be carried out in three-dimensional space, but also on a surface, known as a measurement surface.

Generally, the command object can be considered to be at a reference electrical potential such as an exposed conductive part or earth.

In the majority of capacitive detection techniques, the electrodes are polarized at an excitation voltage. A capacitive coupling is therefore measured between these polarized electrodes and the object at the reference potential.

In the case of a portable appliance such as a smart phone or a tablet, the electrical circuit comprises a reference potential or an internal earth which is floating with respect to earth, since it is supplied by a battery. However, through the effect of the capacitive couplings with its environment (in particular when it is held in a user's hand), this internal reference potential is set to earth or at least to the potential of the user's body. Thus, when the other hand comes close to the measurement electrodes, it is "seen" as being substantially at the internal reference potential or at the earth potential of the device.

There is an interest in the development of portable appliances, such as smart phones or tablets, which contain sensitive surfaces provided with measurement electrodes in places other than the display screen. Such appliances can be for example equipped with electrodes on the opposite face to the screen and/or on the sides, so as to detect additional items of information on their environment, the manner in which they are held, etc.

The problem arising in this case is that due to the floating nature of the installed electronics with respect to earth, if measurement electrodes polarized at an excitation voltage are in electrical contact or strongly coupled (capacitively) with for example the user's hand holding the device, the entire body of the user is "seen" by the electronics as substantially at this excitation potential. In this case the command object which is for example his other hand is also "seen" as being substantially at the excitation potential of the electrodes. The capacitive coupling is then zero or very weak and the object is not detected, or only at a short distance.

Capacitive detection techniques are also used to equip systems such as robots or mobile medical imaging appliances (scanners, etc.) in order to make them sensitive to their environment. The principle is the same: the capacitive coupling is measured between capacitive electrodes polarized at an excitation voltage and objects of the environment assumed to be at a reference electrical potential to an exposed conductive part or to earth.

When two objects equipped with capacitive electrodes are displaced relative to each other, there is a risk that they may not detect one another, because if the measurement electrodes are at the same potential no capacitive coupling is established between them. Furthermore, this is the guard principle which is used in the majority of capacitive detection systems: the electrodes are protected from undesirable environmental influences (parasitic capacitances) by having conductive surfaces at the same excitation potential in proximity.

A subject of the present invention is to propose a method for capacitive detection and a device which make it possible to overcome these drawbacks of the prior art.

Another subject of the present invention is to propose a capacitive detection method and device making it possible to equip electrically floating appliances with respect to a general exposed conductive part or to earth with capacitive detection electrodes capable of detecting the approach of objects of interest such that the measurements are not, or only slightly, affected by strong electrical couplings of certain electrodes with the exposed conductive part or earth.

Another subject of the present invention is to propose a method for capacitive detection and a device which makes it possible to equip portable appliances such as smart phones or tablets with capacitive detection electrodes on a plurality of faces such that the measurements are not, or only slightly, affected by strong electrical couplings of certain electrodes with the exposed conductive part or earth.

Another subject of the present invention is to propose a method for capacitive detection and a device which makes it possible to equip a plurality of appliances with capacitive detection electrodes such that these appliances are also capable of detecting each other.

SUMMARY

This objective is achieved with a method for capacitive detection, implementing a plurality of electrodes capable of allowing the detection of objects in their proximity by capacitive coupling, characterized in that it comprises a step of simultaneous polarization of at least a part of said electrodes with different excitation potentials, said excitation potentials being generated with respect to a reference potential such that the scalar product over a predetermined duration of at least two of these excitation potentials is zero or very much less than the scalar product of one and/or the other of these excitation potentials with itself over said predetermined duration.

The excitation potentials can correspond for example to time values of excitation electrical signals referenced to the reference potential, or also to electrical voltage differences with respect to the reference potential.

Of course, any number of different excitation potentials can be utilized within the scope of the invention. In particular, two excitation potentials, or a number of excitation potentials greater than two, can be utilized.

According to embodiments, the generated excitation potentials can comprise:
  at least one excitation potential variable over time;
  periodic excitation potentials having different frequencies;
  at least one excitation potential the frequency content of which is spread over a spectral band;
  two periodic excitation potentials of the same frequency in phase quadrature;
  at least one excitation potential the scalar product of which with an interference signal is minimized;
  at least one excitation potential substantially equal to the reference potential.

The method according to the invention can also comprise a step of measuring the capacitive coupling of an electrode, comprising:
  acquisition of representative measurements of the electrical charge of the electrode, and
  demodulation of said representative measurements of the charge by using the excitation potential of said electrode.

According to another aspect, a capacitive detection device is proposed, comprising a plurality of electrodes capable of allowing the detection of objects in their proximity by capacitive coupling, and comprising moreover excitation means capable of simultaneously polarizing at least a part of said electrodes with different excitation potentials, said excitation potentials being generated with respect to a reference potential such that the scalar product over a predetermined duration of at least two of these excitation potentials is zero or very much less than the scalar product of one and/or the other of these excitation potentials with itself over said predetermined duration.

The device according to the invention can also comprise:
  measurement means referenced to the same excitation potential as the electrodes to which they are linked.
  demodulation means linked to the measurement means, and capable of producing a representative measurement of the capacitive coupling referenced to the reference potential.

According to embodiments, the device according to the invention can also comprise means making it possible to polarize at least one electrode:
  at several different excitation potentials, and/or
  at at least one excitation potential or at the reference potential.

According to another aspect, an appliance is proposed comprising a device for capacitive detection, and implementing the method according to the invention.

According to embodiments, the device according to the invention can comprise on a first face a display screen and first substantially transparent electrodes polarized at a first excitation potential, and on a second face opposite to the first face, second electrodes polarized at a second excitation potential.

The device can be in particular of one of the following types: smart phone, tablet.

According to embodiments, the device according to the invention can comprise a plurality of modules capable of moving in relation to each other, each module comprising electrodes polarized at an excitation potential different from the other modules.

BRIEF DESCRIPTION OF THE DRAWINGS

Other advantages and characteristics of the invention will become apparent on reading the detailed description of an embodiment which is in no way limitative, and the following attached diagrams.

DETAILED DESCRIPTION

Of course, the embodiments of the invention presented as well as the distribution and arrangement of the electrodes described in these embodiments are in no way limitative. They are given simply by way of representative example.

A first embodiment of the invention will be described with reference to FIG. 1.

This embodiment corresponds for example to the implementation of the invention in an electronic device 2 or an appliance 2 such as a telephone, a smart phone, a PC tablet, which contains for example several screens, or one screen and sensitive zones such as buttons, etc.

Figure 1:
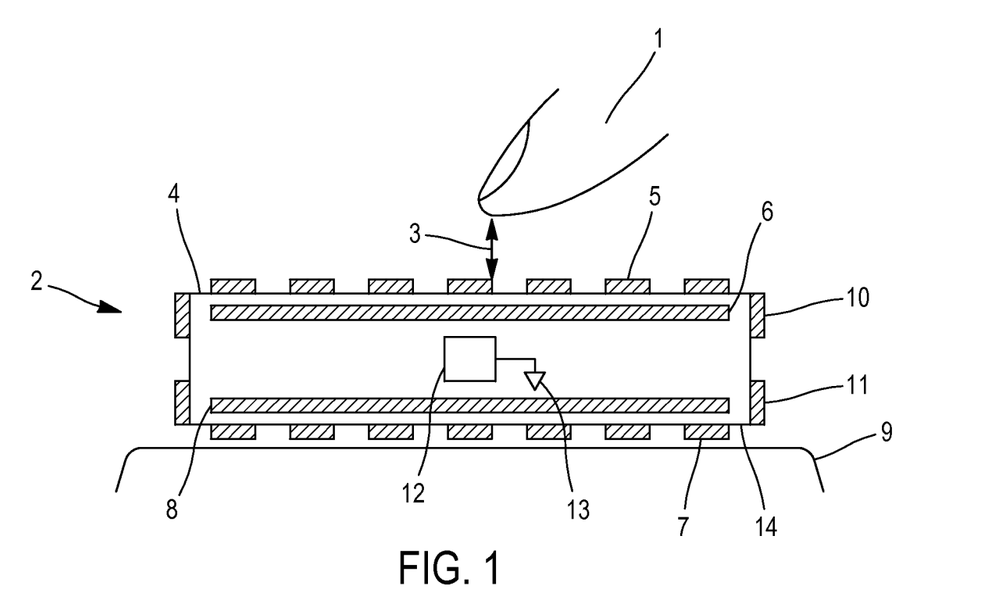
FIG. 1 shows a first embodiment of the invention.

In the example shown in FIG. 1, the appliance 2 which is presented in cross section represents a smart phone or a PC tablet. It comprises a first face with a display screen 4 equipped with first transparent capacitive electrodes 5 distributed (for example in a matrix arrangement) over its surface. These first electrodes 5 and their associated electronics make it possible to detect the position, the distance 3 and/or the contact of a command object 1 on the display screen 4. The command object 1 can be for example a user's finger. The positions and distances detected are then translated into command terms by the control software of the human-machine interface of the appliance 2.

In standard fashion, the device comprises a first conductive guard surface 6 situated behind the first electrodes 5 of the screen, between these electrodes 5 and the other elements of the appliance 2. This first guard 6 is polarized at the same excitation electrical potential as the first electrodes 5, so as to avoid the parasitic capacitive couplings between the first electrodes 5 and internal elements of the appliance 2, such as the electronics 12.

The excitation electrical potential is defined with respect to a reference potential 13 which corresponds to the general mass of the electronics 12 of the appliance 2. It should be noted that in the case of a battery-powered portable appliance, in the absence of a galvanic link or of significant coupling with earth, this reference potential 13 is floating with respect to earth.

The appliance 2 also comprises second electrodes 7 distributed (for example in a matrix arrangement) over a second surface 14 opposite to the surface supporting the screen 4. These second electrodes 7 can be transparent electrodes superimposed on a second display screen, or electrodes simply equipping the case of the appliance 2.

These second electrodes 7 and their associated electronics make it possible to detect the position, the distance 3 and/or the contact of objects in their environment.

The appliance 2 also comprises a second conductive guard surface 8 situated behind the second electrodes 7 of the screen, between these electrodes 7 and the other elements of the appliance 2. This second guard 8 is polarized at the same excitation electrical potential as the second electrodes 7, so as to avoid parasitic capacitive couplings between the second electrodes 7 and internal elements of the appliance 2, such as the electronics 12.

The appliance 2 can also comprise third electrodes 10, 11 on the lateral faces.

When the screen 4 is used (for example), the second face 14 and the lateral faces are favoured locations for holding the appliance 2 in the hand, or placing it on the palm of the hand, or even placing it on a table or on the floor.

The devices of the prior art which comprise only first electrodes 5 are designed so that when they are held or set down, the general mass of the electronics 12 is coupled (by electrical contact or by capacitive coupling) to the user's body and/or to the support. Under these conditions it is possible to ensure that the reference potential 13 corresponds substantially to the potential of the user's body and/or to earth. A finger or a conductive object held by the user then constitutes a command object 1 substantially at the reference potential 13 and can therefore be detected under the best conditions by the first electrodes 5.

When an appliance 2 as shown in FIG. 1 is placed on a support 9 such as a hand or a table on the side for example of the second electrodes 7, a strong capacitive coupling is established between the support 9 and these electrodes 7. The result is that, with respect to the internal reference potential 13 of the appliance 2, the support 9 appears as polarized at the excitation potential of the second electrodes 7. According to the same argument as previously, the command object 1 is "seen" with respect to the internal reference potential 13 of the appliance 2 as polarized substantially at the same potential as the support 9, i.e. at the excitation potential of the second electrodes 7. If the excitation potential is identical for all the electrodes as in the devices of the prior art, the command object 1 no longer generates capacitive coupling with the electrodes and therefore can no longer be detected (or at least only with severely degraded performance).

The solution implemented by the invention, which is detailed below, comprises the generation of different excitation potentials that are substantially orthogonal in the mathematical sense for the first electrodes 5 and the second electrodes 7.

With regard to the third electrodes 10, 11 on the lateral faces, different options are possible, in particular when the appliance 2 is a smart phone or a tablet. According to a section or a cross-sectional view:

- the appliance 2 can comprise separate third electrodes 10, 11, respectively towards the first and second faces 4, 14, as shown in FIG. 1. In this case one of the third electrodes 10 can be at the excitation potential of the first electrodes 5, and one of the third electrodes 11 can be at the excitation potential of the second electrodes 7;
- it is possible for the appliance 2 to comprise a third electrode 10 or 11 only which covers at least a part of the lateral face. In this case, this third electrode can be at the excitation potential of the first electrodes 5 or at the excitation potential of the second electrodes 7. It can optionally be switched from one excitation potential to the other depending on items of information originating from the measurements of the first and/or the second electrodes. The third electrode 10 or 11 can also be at an excitation potential different from that of the first and the second electrodes.

Along the lateral faces, the third electrodes can constitute a ring surrounding the appliance 2, or comprise several electrodes, distributed over these lateral faces.

A second embodiment of the invention will now be described with reference to FIG. 2.

This embodiment corresponds for example to the implementation of the invention in modules 21, 22 that are mobiles in relation to each other and to their environment. This type of configuration can be found for example in robotics or in the medical imaging appliances containing mobile parts, such as scanners.

For example, in robotics for medical imaging, it may be necessary to utilize several modules 21, 22 or several robots 21, 22 which operate close to the same patient. Each module 21, 22 has at least one capacitive detection zone 23, 24 with electrodes 5, 7 in order to avoid collisions and/or to make its movement autonomous without collision. It is also necessary for the capacitive detection zone 23 of a module 21 to recognize the detection zone 24 of another module 22 as target object in order to avoid all risk of collision between these modules.

Again, if the capacitive electrodes of the respective detection zones 23, 24 of the modules 21, 22 are subjected to the same excitation potential as in the systems of the prior art, there is no capacitive coupling between them and they cannot detect each other.

The solution implemented by the invention, which is detailed below, comprises the generation of different excitation potentials, substantially orthogonal in the mathematical sense for the electrodes of the detection zones of the different modules 21, 22. The measurements of the different modules 21, 22 are managed by one and the same capacitive measurement device 25.

Figure 2:
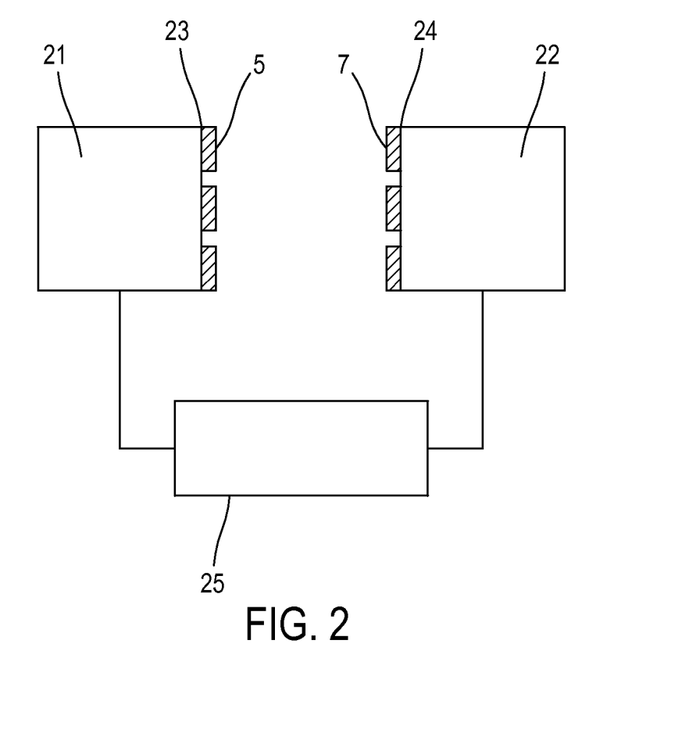
FIG. 2 shows a second embodiment of the invention.

Of course, the modules 21, 22 in FIG. 2 can also be provided with several detection zones or electrodes on several faces, as shown in FIG. 1. In this case the detection zones can be managed as explained below so as not to cause mutual interference between zones of one and the same module and/or of different modules.

A circuit diagram 12 for the implementation of the invention will now be described with reference to FIG. 3.

The present diagram is based on the teaching of the document FR 2 756 048, to which reference may be made for the details of implementation.

The diagram presented comprises a plurality of parallel measurement paths. FIG. 3 shows an example with two measurement paths.

Each measurement path allows the control and acquisition of measurements on one or a plurality of electrodes, as well as the generation of a different excitation potential for these electrodes.

Figure 3:
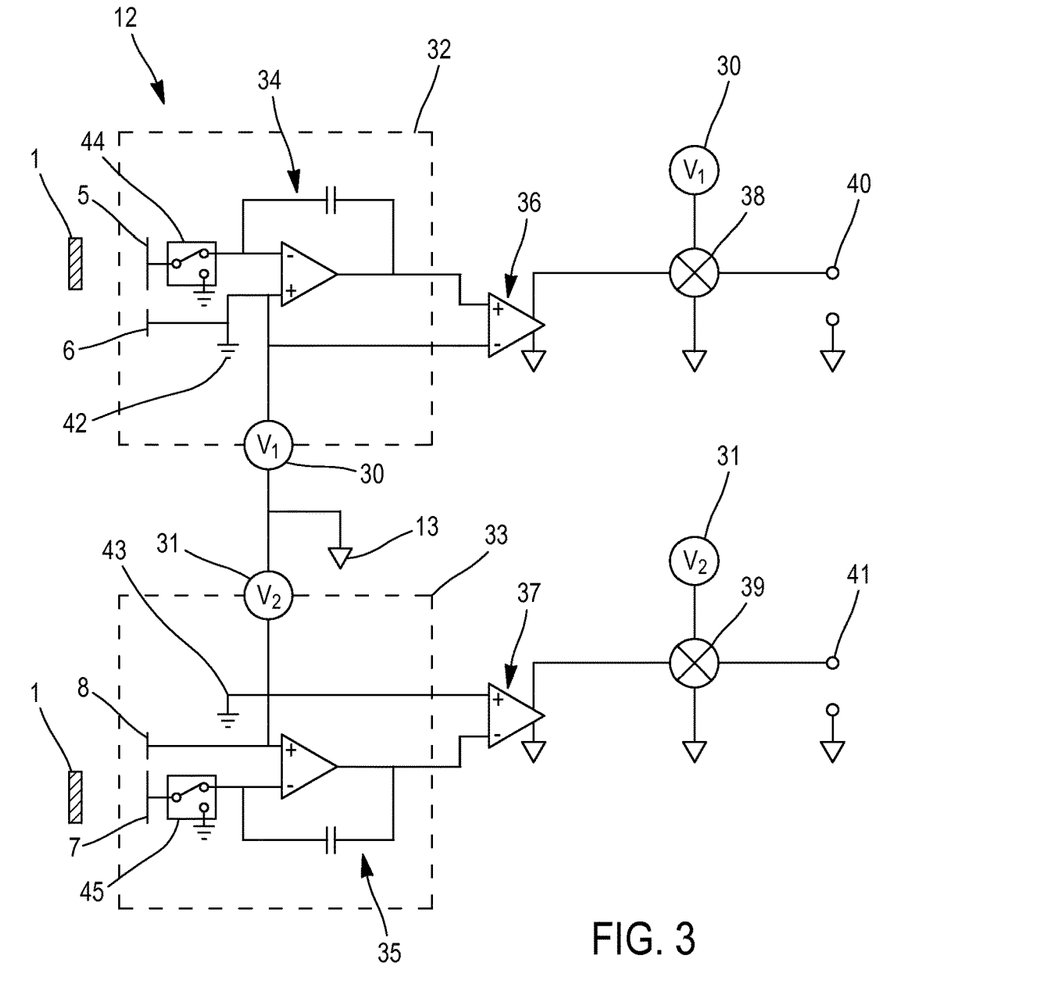
FIG. 3 shows a circuit diagram of the electronics for implementation of the invention

Of course, the diagram in FIG. 3 can be generalized so as to:
implement any number of parallel measurement paths;
implement any number of different excitation potentials, for different measurement paths;
implement measurement paths in parallel with the same excitation potential, so as to allow the acquisition of several measurements simultaneously on electrodes polarized at the same excitation potential.

The diagram for the first measurement path will now be described in detail, with the numerical references corresponding to the second measurement path in parentheses.

The detection electronics 12 comprises a part 32 (33), known as "floating", referenced to the excitation potential 42 (43), and which comprises the first measurement steps closest to the electrodes. The excitation potential 42 (43) is generated by a voltage source 30 (31) variable over time referenced to the reference potential 13 of the electronics 12.

The floating electronics 32 (33) essentially comprises a charge amplifier 34 (35) referenced to the excitation potential 42 (43). This charge amplifier 34 (35) is linked at the input to a measurement electrode 5 (7). It makes it possible to generate a voltage proportional to the accumulated charge in the electrode 5 (7), which depends on the coupling capacitance developed by the objects 1 (9) in the proximity of the electrode 5 (7).

The floating electronics 32 (33) also comprises a multiplexer 44 (45) or a scanner which makes it possible to "poll" sequentially a plurality of electrodes 5 (7) with a single measurement path. This multiplexer 44 (45) is designed so as to link the electrodes 5 (7):
either to the input of the charge amplifier 34 (35) in order to acquire measurements,
or to the reference potential 42 (43), in which case the corresponding electrodes behave like guard electrodes 6 (8), which makes it possible to avoid the appearance of parasitic capacitances with active electrodes linked to the input of the charge amplifier 34 (35).

The output signal of the charge amplifier 34 (35) is referenced to the excitation potential 42 (43). It is converted by a differential amplifier 36 (37) into a signal referenced to the reference potential 13. Of course, the differential amplifier 36 (37) can be replaced by any other components making it possible to transfer a signal between electronic stages with different reference potentials.

The measurement signal is then demodulated by a demodulator 38 (39) in order to produce a measurement 40 (41) representative of the distance or of the coupling of the electrodes 5 (7) with the object(s) 1 (9). In practice, the demodulator 38 (39) is digital.

This detection principle makes it possible to produce measurements with very high sensitivity and very great precision because all the electronic elements close to the electrodes 5 (7) are referenced and/or polarized at the excitation potential 42 (43). Due to the structure of the charge amplifier 34 (35), the electrodes 5 (7) are also polarized at the excitation potential 42 (43). Thus no parasitic capacitances can appear. Moreover, guard elements polarized at the excitation potential 42 (43), including guard electrodes 6 (8), can be added in the proximity of the measurement electrodes 5 (7) or of their connection tracks in order to avoid the appearance of parasitic capacitances with elements in proximity subject to another potential.

The electronics in FIG. 3 can be implemented in the device in FIG. 1 such that, for example,
all the electrodes of one face 4, 14 are controlled by one and the same electronic measurement path. Thus according to the configurations represented, the first measurement path controls all the first electrodes 5 of the first face 6, and the second measurement path controls all the second electrodes 7 of the second face 14;
the electrodes of one face 4, 14 are distributed in zones and controlled by several electronic measurement paths respectively. This can make it possible to improve the precision and the independence of the measurements in different zones;
the lateral electrodes 10, 11 are controlled by a first and a second measurement path respectively;
the lateral electrodes 10, 11 are optionally linked to a first measurement path or to a second measurement path by switching means. The switch can be carried out depending on items of information originating from other electrodes;
the lateral electrodes 10, 11 are controlled by a third electronic measurement path;

Similarly, the electronics in FIG. 3 can be implemented in the device in FIG. 2 such that, for example, all the electrodes of a module 21, 22 are controlled by one and the same electronic measurement path. Thus according to the configurations shown, the first measurement path controls all the first electrodes 5 of the first module 21, and the second measurement path controls all the second electrodes 7 of the second module 22.

As explained previously, a subject of the invention is to provide a method which makes it possible to manage a multiplicity of detection zones, some of which may be strongly coupled with the user or the target.

According to a first variant embodiment of the invention, all of the electrodes of one or more detection zones are switched to the reference potential 13 when measurements are acquired with electrodes of another detection zone. Thus, it is possible of avoid the detection zones causing mutual interference, either by direct coupling as in the case in FIG. 2, or via coupling with a command object as in the case in FIG. 1.

More specifically, with reference to the diagram in FIG. 2, this can be carried out advantageously by switching an excitation potential 43 for example to the reference potential 13. In practice this can be carried out in particular by short-circuiting the voltage source 31, which means switching it off or generating a zero voltage. Thus, all the elements referenced to this excitation potential 43 are set to the reference potential 13, including the guard elements 8.

This first variant of the invention can be implemented in the embodiment in FIG. 1 as follows:
the excitation potential 43 of the second electrodes 7 is switched to the reference potential 13, so as to set the second electrodes 7 of the second face 14 at this reference potential 13;
measurements are carried out with the first electrodes 5. Thus, even if the second electrodes 7 are strongly coupled to the user's hand 9 which is holding the phone by its second face 14 (for example), it is possible to detect a finger 1 with the first electrodes 5 under optimum conditions, since the user is "seen" by these electrodes as being at the reference potential 13;

then, in the same way, the excitation potential 42 of the first electrodes 5 is switched to the reference potential 13 so as to set the first electrodes 5 of the first face 4 at this reference potential 13, then measurements are carried out with the second electrodes 7. Thus, the device can be held and used on both its faces, optionally in the same way.

The first variant of the invention can also be implemented in the embodiment in FIG. 2 as follows:

the excitation potential 43 of the second electrodes is switched to the reference potential 13, so as to set the second electrodes 7 of the second module 22 at this reference potential 13;

measurements are carried out with the first electrodes 5 of the first module 21. Thus, these first electrodes 5 are sensitive in the same way to the presence of the second module 22, including along the detection zone 24, as to the rest of the environment;

then, in the same way, the excitation potential 42 of the first electrodes 5 is switched to the reference potential 13 so as to set the first electrodes 5 of the first module 21 at this reference potential 13, then measurements are carried out with the second electrodes 7 of the second module 22.

Of course, all the strategies of time multiplexing and scanning of the different detection zones can be implemented within the scope of the invention.

This first variant of the invention however has the drawback that the electrodes of the different detection zones must be activated and polled sequentially.

A second variant will now be presented, corresponding to a preferred embodiment of the invention, which makes it possible to carry out measurements simultaneously in several detection zones while minimizing the risks of interference between these zones.

Figure 4:
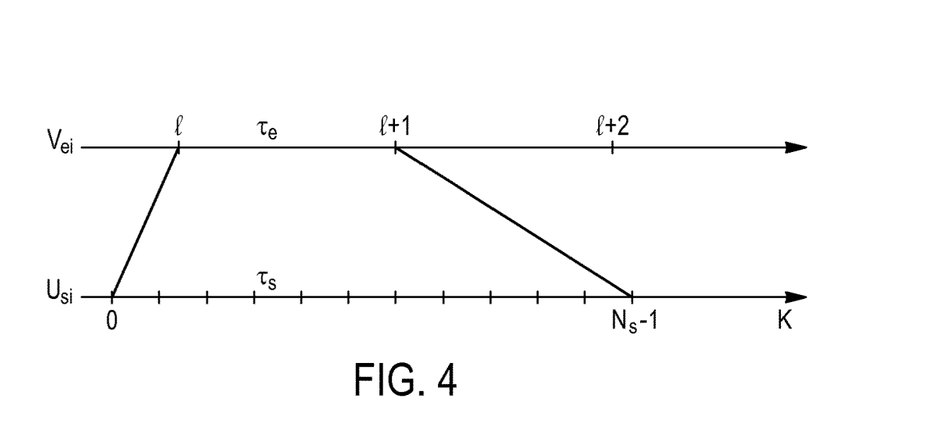
FIG. 4 shows a chronogram of acquisition of the measurements.

With reference to FIG. 4, the name $V_{e1}(l)$ is given to the (digital) coupling signal obtained at the output 40 of the demodulator 38 of the first path of the detection electronics and which provides a representative measurement of the capacitive coupling or of the distance between a first measurement electrode 5 and an object of interest 1.

More generally, the name $V_{ei}(l)$ is given to the coupling signal originating from the path i (i=1, 2, . . . ) of the detection electronics.

The coupling signal $V_{ei}(l)$ is updated with a time interval greater than or equal to the duration of accumulation $\tau_e$ of the measurements in the demodulator 38 as will be described below. It can correspond for example:

to a series of measurements acquired with the same first electrode 5, or to successive measurements acquired with different first electrodes 5 polarized at the same reference potential 42, and switched by the multiplexer 44.

The name $U_{s1}(t)$ is given to the analogue charge measurement signal, referenced to the reference potential 13, which appears at the output of the differential amplifier 36.

More generally, the name $U_{si}(t)$ is given to the charge measurement signal of the path i (i=1, 2, . . . ) of the detection electronics.

This charge measurement signal $U_{si}(t)$ corresponds to the product of the electrical charge $Q_{ei}(t)$ accumulated in the measurement electrode (i.e. the electrode 5 for the path i=1) with a charge amplification gain $G_{ei}$, i.e., $$U_{si}(t)=G_{ei}Q_{ei}(t), \tag{Eq. 1}$$

or, in a sampled digital form with a time interval $\tau_s$, $$U_{si}(k)=G_{ei}Q_{ei}(k), \tag{Eq. 2}$$

The charge measurement signal is demodulated in the demodulator 38 (for the path 1) in order to obtain the coupling signal $V_{ei}(l)$. This demodulation is a synchronous amplitude demodulation (low-pass filter and baseband transposition) in which the excitation signal of the path concerned is used as local oscillator 30, 31. It is carried out digitally. It comprises a term-to-term multiplication of the charge measurement signal $U_{si}(k)$ with the excitation signal $V_i(k)$ of the corresponding path i and a summation of the terms of the product over an accumulation time interval $\tau_e$, i.e., $$V_{ei}(l)=\Sigma_{k=0}^{N_s-1}U_{si}(k)V_i(k) \tag{Eq. 3}$$

With k=0 . . . $N_s-1$ and $N_s=\tau_e/\tau_s$.

The excitation signal $V_i(k)$ can be written in the general form of a product of an amplitude term and a base function $b_i(k)$ which defines its temporal shape, i.e.:

$$V_i(k)=|V_i|b_i(k). \tag{Eq. 4}$$

As explained previously, the presence of elements polarized at potentials different from the reference potential 13 can distort the measurements. These distortions can be modelled by equivalent capacitances, essentially in parallel, linking a measurement electrode to the different interference voltage sources.

For example, in the case in FIG. 3, taking account of an additional electrical interference source $V_p$, the charge measured on a first electrode 5 polarized at a first excitation potential $V_1(t)$ in the presence of an object of interest 1 can be expressed as follows:

$$Q_{e1}(t)=C_{11}V_1(t)+C_{12}V_2(t)+C_{1p}V_p(t). \tag{Eq. 5}$$

The capacitance $C_{11}$ is the capacitance to be measured between the electrode 5 and the object of interest 1 assumed to be at the reference potential 13. The capacitance $C_{12}$ is a parasitic capacitance due for example to partial coupling between the object of interest 1 and second electrodes 7 (and guard electrodes 8) polarized at the second excitation potential $V_2(t)$. Similarly, the capacitance $C_{1p}$ is a parasitic capacitance due to couplings with the additional electrical interference source $V_p$.

The additional electrical interference source $V_p$ can be due for example to a connection of a portable appliance to a charger.

There may also be a voltage source present at the object of interest 1, for example:

due to interference associated with its operation;

intentionally generated for its operation, in the case for example in which the object of interest 1 is an active stylus polarized at its own excitation potential. This excitation potential of the stylus can then be chosen so as to contribute to the measurement or to improve the measurement with at least one of the measurement paths, or with several measurement paths sequentially. In this case, it can be for example synchronous with the excitation potential of the electrodes of at least one measurement path.

The charge measured can be re-written in a factorized digital form, i.e., $$Q_{ei}(k)=C_{e1}[\alpha_{11}V_1(k)+\alpha_{12}V_2(k)+\alpha_{1p}V_p(k)]. \tag{Eq. 6}$$

By combining Eq. 6 and Eq. 3, the expression of the coupling signal is obtained:

$$V_{e1}(l)=G_{e1}C_{e1}\Sigma_k[\alpha_{11}V_1(k)+\alpha_{12}V_2(k)+\alpha_{1p}V_p(k)V_1(k)]. \tag{Eq. 7}$$

This expression can be re-written in the form:

$$V_{e1}(l) = G_{e1} C_{e1} \{\alpha_{11} \Sigma_k V_1(k)V_1(k) + \alpha_{12} \Sigma_k V_1(k)V_2(k) + \alpha_{1p} \Sigma_k V_1(k)V_p(k)\}. \quad (Eq.\ 8)$$

By introducing Eq. 4 into Eq. 8, the expression of the coupling signal is finally obtained:

$$V_{e1}(l) = G_{e1} C_{e1} \{\alpha_{11}|V_1|^2 \Sigma_k b_1^2(k) + \alpha_{12}|V_1||V_2|\Sigma_k b_1(k)b_2(k) + \alpha_{1p} \Sigma_k V_1(k)V_p(k)\}. \quad (Eq.\ 9)$$

This expression can be generalized for any number $i$ of excitation potentials $V_i$ in the form:

$$V_{ei}(l) = G_{ei} C_{ei} \{\alpha_{ii}|V_i|^2 \Sigma_k b_i^2(k) + \Sigma_{j,j\neq i}(\alpha_{ij}|V_i||V_j|\Sigma_k b_i(k)b_j(k)) + \alpha_{ip} \Sigma_k V_i(k)V_p(k)\}. \quad (Eq.\ 10)$$

The first term of the general expression of the coupling signal $V_{ei}(l)$, which depends only on the excitation potential $i$, corresponds to the value that it is desired to measure.

The other terms, which depend on other excitation potentials $j$ or additional interference signals $V_p$ are parasitic terms, the influence of which must be minimized.

In order to simplify the notation, the scalar product can be defined over the vector space of dimension $N_s$ of the base functions $b_i$ such that:

$$b_i \cdot b_j = \Sigma_{k=0}^{N_s-1} b_i(k)b_j(k). \quad (Eq.\ 11)$$

The norm of a function $b_i$ is then:

$$|b_i|^2 = \Sigma_{k=0}^{N_s-1} b_i^2(k). \quad (Eq.\ 12)$$

Thus it can be seen that in order to minimize the influence of the interference in the general expression of the coupling signal $V_{ei}$, excitation signals $V_i$ must be chosen so that the scalar product of two different base functions $b_i$, $b_j$ (for example corresponding to different measurement paths) is negligible or at least very much less than the norm of the base function $b_i$ of the excitation signal $V_i$ of the electrode in question:

$$|b_i| \gg b_i \cdot b_j. \quad (Eq.\ 13)$$

Of course, if it is desired to carry out measurements simultaneously with the electrodes polarized at the excitation potential $V_j$, it is also necessary to satisfy the symmetrical condition:

$$|b_j| \gg b_i \cdot b_j. \quad (Eq.\ 14)$$

The same reasoning can be applied with respect to an interference signal $V_p$ insofar as this signal can be sufficiently known (either theoretically or resulting from measurements). Its influence on the measurements can be minimized if an excitation signal $V_i$ can be chosen so that its scalar product with the interference signal $V_p$ is negligible or at least very much less than the norm of the excitation signal $V_i$.

All the base functions which make it possible to satisfy or at least approximate to these criteria can be used within the scope of the invention.

So as to ensure good independence of the signal detected by each measurement path $i$ with respect to the other terms, base functions $b_i$ can be chosen so as to obtain for example a decibel ratio $$A = 20 \log\left(\frac{b_i \cdot b_j}{|b_i|^2}\right) \quad (Eq.\ 15)$$

of the order of −20 dB or less, or of the order of −30 dB, or −40 dB, or less. Thus, the interference on the amplitude of the coupling signal due to the parasitic sources will not exceed this decibel value.

The base functions can be discrete functions which can adopt two values, such as +1 and −1.

The base functions can also be discrete functions which can adopt a more complete set of discreet values such as:

+1; 1/root(2); 0; −1/root(2); −1.

This allows better control of the generated energy spectrum towards the high frequencies, by choosing adjacent values for successive indices k. This also makes it possible to generate functions approaching pure sine curves.

Criteria are given here, by way of non-limitative example, which can be used for generating base functions:

- the base functions $b_i$ can be chosen so as to generate a periodic square-wave signal pattern, or close to a sine curve. Each base function $b_i$ can then be essentially represented by a frequency $f_i$;
- a choice can then be made to distance the frequencies $f_i$ from each other, or they can be chosen in a suitable manner in order to obtain orthogonality between different base functions $b_i$;
- in order to generate two excitation potentials, it is possible to generate signals with identical frequencies $f_1$, $f_2$, but with a phase shift of 90 degrees. The signals are then in phase quadrature.
- the base functions $b_i$ can be chosen so as to minimize the energy peaks, or smooth the spectrum. It is possible to use a frequency dispersion strategy, which can make it possible to minimize the energy radiated at certain frequencies by the device;
- the base functions $b_i$ can be chosen so as to minimize the energy at the low frequencies where the 1/f noise adversely affects the system, and/or in order to avoid energy at high frequencies for reasons of electromagnetic compatibility or consumption;
- for each of the above strategies, the choice can also be oriented in order to minimize the term of the scalar product subjected to parasitic interference $V_p$, so as to minimize its influence.

With respect to implementation in a device,

- the base functions $b_i$ can be pre-calculated and stored in the device, to which they are available in real time without additional calculation;

several sets of functions can be available in advance. The choice between these bases can then be made according to criteria such as the minimization of the effects of interference signals $V_p$;

it is possible to switch between the different sets of base functions between successive acquisitions of the coupling signal $V_{ei}(l)$, therefore between periods $\tau_e$ if necessary. In the diagram in FIG. 2, this means changing the shapes of signals generated by the excitation sources 30, 31 over time, or switching different excitation sources 30, 31. The entire device can thus be dynamically reconfigured depending on its environment.

It should be noted that the variant embodiment in which electrodes are polarized at the reference potential 13 complies with the criterion of generation of polarization potentials which minimize the scalar product of the crossed terms. In fact if $b_i$ is the base function of the polarization potential of the electrodes used for the measurement and $b_j$ the base function of the electrodes at the reference potential, then $b_j=0$, $b_i \cdot b_j=0$ and therefore $|b_i| \gg b_i \cdot b_j$ according to Eq. 13.

Of course, in this case simultaneous measurements with the electrodes polarized at the reference potential 13 are not carried out, and therefore it is not necessary to satisfy the symmetrical condition of Eq. 14.

By way of example of application, it is possible to implement the invention under the following conditions:

$\tau_s = 5$ μs $\tau_e = 8$ ms $N_s = 1600$

It is also possible to generate in particular the following families of excitation potentials, with k=0 . . . $N_s$−1:

with two different and orthogonal frequencies:
  $b_1(k)$=+1; +1; −1; −1; +1; +1; −1; −1; . . . repeated 199 times;
  $b_2(k)$=+1; +1; +1; +1; −1; −1; −1; −1; . . . repeated 199 times.

with two identical frequencies and quadrature signals:
  $b_1(k)$=+1; +1; −1; −1; +1; +1; −1; −1; . . . repeated 199 times;
  $b_2(k)$=−1; +1; +1; −1; −1; +1; +1; −1; . . . repeated 199 times.

Of course, the invention is not limited to the examples which have just been described and numerous adjustments can be made to these examples without exceeding the scope of the invention.

The invention claimed is:

1. A method for capacitive detection, implementing a plurality of electrodes capable of allowing the detection of one or more objects capacitively coupled to an earth potential and in proximity to the plurality of electrodes by capacitive coupling, the method comprising:
   locating a first group of the plurality of electrodes along a first zone of a device having a reference potential;
   locating a second group of the plurality of electrodes along a second zone of the device;
   polarizing the second group of electrodes on the second zone at a second excitation potential generated by second floating electronics referenced to a second voltage source referenced to the reference potential; and
   simultaneously polarizing the first group of electrodes on the first zone at a first excitation potential generated by first floating electronics referenced to a first voltage source referenced to the reference potential wherein a scalar product over a predetermined duration of the first and second excitation potentials is zero.

2. The method of claim 1, wherein the first and second excitation potentials comprise at least one excitation potential that is variable over time.

3. The method of claim 1, in which the first and second excitation potentials comprise periodic excitation potentials of different frequencies.

4. The method of claim 1, wherein the first and second excitation potentials comprise at least one excitation potential, and wherein a frequency content of the at least one excitation potential is spread over a spectral band.

5. The method of claim 1, wherein the first and second excitation potentials comprise two periodic excitation potentials of the same frequency in phase quadrature.

6. The method of claim 1, wherein the first and second excitation potentials comprise at least one excitation potential substantially equal to the reference potential.

7. The method according to claim 1, further comprising measuring the capacitive coupling of a particular electrode of the plurality of electrodes by:
   acquisition of representative measurements of an electrical charge of the electrode, and
   demodulation of said representative measurements of the charge by using an excitation potential of the particular electrode.

8. A device for capacitive detection having a reference potential, comprising:
   a plurality of electrodes capable of allowing the detection of one or more objects capacitively coupled to an earth potential and in proximity to the plurality of electrodes by capacitive coupling;
   at least a first zone and a second zone located on the device, the plurality of electrodes formed along at least the first and second zones, a second group of the plurality of said electrodes on the second zone configured for being polarized at a second excitation potential generated by second floating electronics referenced to a second voltage source referenced to the reference potential; and
   a plurality of voltage sources capable of simultaneously polarizing a first group of the plurality of said electrodes on the first zone at a first excitation potential generated by first floating electronics referenced to a first voltage source referenced to the reference potential while polarizing the second group of electrodes at the second excitation potential wherein a scalar product over a predetermined duration of the first excitation potential and the second excitation potential is zero.

9. The device of claim 8, further comprising a charge amplifier linked to the plurality of electrodes, and wherein the charge amplifier is configured to be referenced to the same excitation potential as the plurality of electrodes.

10. The device of claim 9, further comprising a demodulator linked to the charge amplifier, and capable of producing a representative measurement of the capacitive coupling referenced to the reference potential.

11. The device of claim 8, further comprising one or more multiplexers configurable to polarize at least one electrode at one of:
   a plurality of different excitation potentials,
   at least one excitation potential, and the reference potential.

12. An appliance comprising:
   a device for capacitive detection having a reference potential, wherein the device comprises:
     a plurality of electrodes capable of allowing the detection of one or more objects capacitively coupled to an earth potential and in proximity to the plurality of electrodes by capacitive coupling;
     at least a first zone and a second zone located on the device, the plurality of electrodes formed along at least the first and second zones, a second group of the plurality of said electrodes on the second zone configured for being polarized at a second excitation potential generated by second floating electronics referenced to a second voltage source referenced to the reference potential; and
     a plurality of voltage sources capable of simultaneously polarizing a first group of the plurality of said electrodes on the first zone at a first excitation potential generated by first floating electronics referenced to a first voltage source referenced to the reference potential while polarizing the second group of electrodes at the second excitation potential wherein a scalar product over a predetermined duration of the first excitation potential and the second excitation potential is zero.

13. The appliance of claim 12, wherein the first zone is on a first face of the device, and wherein the second zone is on a second face of the device, and wherein the second face is opposite to the first face.

14. The appliance of claim 13, which is of one of the following types: smart phone, tablet.

15. The appliance of claim 12, comprising a plurality of modules capable of moving in relation to each other, each module comprising electrodes polarized at an excitation potential different from other modules of the plurality of modules.

16. The method of claim 1, wherein the first zone is on a first surface of the device and the second zone is on a second surface of the device, wherein the first surface is different from the second surface.

17. The method of claim 1, wherein the first zone is on a first surface of the device and the second zone is on a second surface of the device, wherein the first surface and the second surface are on different sides of the device.

18. The device of claim 8, wherein the first zone is on a first surface of the device and the second zone is on a second surface of the device, wherein the first surface is different from the second surface.

19. The device of claim 8, wherein the first zone is on a first surface of the device and the second zone is on a second surface of the device, wherein the first surface and the second surface are on different sides of the device.

* * * * *